(12) United States Patent
Koteshwar Srinath et al.

(10) Patent No.: US 12,273,854 B2
(45) Date of Patent: Apr. 8, 2025

(54) APPARATUS AND METHOD FOR USER EQUIPMENT POSITIONING AND NETWORK NODE USING THE SAME

(71) Applicant: NOKIA TECHNOLOGIES OY, Espoo (FI)

(72) Inventors: Pavan Koteshwar Srinath, Orsay (FR); Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 341 days.

(21) Appl. No.: 17/924,947

(22) PCT Filed: May 7, 2021

(86) PCT No.: PCT/EP2021/062174
§ 371 (c)(1),
(2) Date: Nov. 11, 2022

(87) PCT Pub. No.: WO2021/228718
PCT Pub. Date: Nov. 18, 2021

(65) Prior Publication Data
US 2023/0199705 A1    Jun. 22, 2023

(30) Foreign Application Priority Data
May 13, 2020   (FI) .................................... 20205479

(51) Int. Cl.
*H04W 64/00* (2009.01)
*H04B 7/06* (2006.01)
(Continued)

(52) U.S. Cl.
CPC ........ *H04W 64/006* (2013.01); *H04B 7/0626* (2013.01); *H04W 24/02* (2013.01); *G06N 3/02* (2013.01)

(58) Field of Classification Search
CPC ... H04W 64/00; H04W 64/006; H04W 24/02; H04B 7/0626
See application file for complete search history.

(56) References Cited

U.S. PATENT DOCUMENTS 10,383,030 B2    8/2019   Jing et al.

FOREIGN PATENT DOCUMENTS

| CN | 115914980 A | * | 4/2023 | ........... H04B 17/252 |
| EP | 3193462 A1 | | 7/2017 | |
| WO | 2019/152849 A1 | | 8/2019 | |

OTHER PUBLICATIONS

International Search Report and Written Opinion dated Jul. 28, 2021 corresponding to International Patent Application No. PCT/EP2021/062174.

(Continued)

*Primary Examiner* — Kevin Kim
(74) *Attorney, Agent, or Firm* — SQUIRE PATTON BOGGS (US) LLP

(57) ABSTRACT

According to the present disclosure, a first dataset comprising CSI measurements associated with first UEs and actual positions of the first UEs within a coverage region of a network node is received. Then, a second dataset comprising at least one CSI measurement associated with at least one second UE whose position within the coverage region of the network node is to be estimated is received. After that, based on the first and second datasets, the at least one CSI measurement associated with the at least one second UE is assigned to one of the first UEs that appears closest to the at least one second UE. Finally, the position of the at least one second UE within the coverage region of the network node is estimated by using a semi-supervised machine learning algorithm that receives the first and second datasets and the actual position of the closest first UE.

14 Claims, 9 Drawing Sheets

(51) Int. Cl.
  *H04W 24/02* (2009.01)
  *G06N 3/02* (2006.01)

(56) References Cited

OTHER PUBLICATIONS

Eric Lei et al., "Siamese Neural Networks for Wireless Positioning and Channel Charting," 2019 57th Annual Allerton Conference on Communication, Control, and Computing (Allerton), IEEE, Sep. 24, 2019, pp. 200-207, XP033646048.
Boris Chidlovskii et al., "Semi-supervised Variational Autoencoder for WiFi Indoor Localization," 2019 International Conference on Indoor Positioning and Indoor Navigation (IPIN), IEEE, Sep. 30, 2019, pp. 1-8, XP033667309.
Mehdi Mohammadi et al., "Semisupervised Deep Reinforcement Learning in Support of IoT and Smart City Services," IEEE Internet of Things Journal, IEEE, vol. 5, No. 2, Apr. 1, 2018, pp. 624-635, XP011680810.
J. H. Seong et al., "Selective Unsupervised Learning-Based Wi-Fi Fingerprint System Using Autoencoder and GAN," IEEE Internet of Things Journal, IEEE, vol. 7, No. 3, Nov. 29, 2019, pp. 1898-1909, XP011778413.
C. Studer, S. Medjkouh, E. Gönültaş, T. Goldstein, and O. Tirkkonen, "Channel Charting: Locating Users Within the Radio Environment Using Channel State Information," in IEEE Access, vol. 6, pp. 47682-47698, 2018.
Office Action dated Mar. 14, 2023, corresponding to Indian Patent Application No. 202217063566.

\* cited by examiner

APPARATUS AND METHOD FOR USER EQUIPMENT POSITIONING AND NETWORK NODE USING THE SAME

TECHNICAL FIELD

The present disclosure relates generally to positioning, and in particular to machine-learning-assisted techniques for user equipment (UE) positioning in a wireless network.

BACKGROUND

Machine learning (ML) algorithms have recently attracted high interest for the purpose of UE positioning in wireless networks thanks to tremendous advances in the processing capabilities and availability of ML tools (such as opensource Python ML libraries). However, available ML-assisted techniques for UE positioning mostly rely on a supervised ML algorithm that requires a large amount of labelled data for its correct operation. This requirement causes the infeasibility of using the supervised ML algorithm for UE positioning, simply because a wireless environment is dynamically varying, and any ML model needs to be frequently retrained with large amounts of freshly acquired labelled data. Unfortunately, getting frequent access to a large amount of relevant labelled data is a huge challenge. On the other hand, the ML model, such as a neural network, trained with only a small amount of labelled data is susceptible to generalization errors, i.e. it makes poor predictions for unseen inputs.

There are also a few semi-supervised ML-assisted techniques for UE positioning which use a limited amount of labelled training data. However, these semi-supervised ML-assisted techniques are either for indoor UE positioning only (and require multiple access points) or have not been designed specifically for high-accuracy UE positioning, for which reason the resulting position estimates are quite inaccurate.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an objective of the present disclosure to provide a technical solution that enables high-frequency UE positioning by using a small amount of labelled data.

The objective above is achieved by the features of the independent claims in the appended claims. Further embodiments and examples are apparent from the dependent claims, the detailed description and the accompanying drawings.

According to a first aspect, an apparatus for UE positioning is provided. The apparatus comprises at least one processor and a memory coupled to the at least one processor. The memory is configured to store processor-executable instructions. The at least one processor is configured, when executing the processor-executable instructions, to:
receive a first dataset comprising channel state information (CSI) measurements associated with first UEs and actual positions of the first UEs within a coverage region of a network node;
receive a second dataset comprising at least one CSI measurement associated with at least one second UE whose position within the coverage region of the network node is to be estimated;
based on the first and second datasets, assign the at least one CSI measurement associated with the at least one second UE to one of the first UEs that appears closest to the at least one second UE; and
based on the first and second datasets and the actual position of the closest first UE, estimate the position of the at least one second UE within the coverage region of the network node by using a semi-supervised ML algorithm.

With the apparatus thus configured, it is possible to obtain high-accuracy UE position estimates with minimal supervision, i.e. by using a limited amount of labelled training data. Moreover, unlike the existing semi-supervised ML-assisted techniques, the apparatus according to the first aspect of the present disclosure is not restricted in application to an indoor scenario, i.e. may also be used for UE positioning within the coverage region of the network.

In one example embodiment of the first aspect, the first UEs comprise radio beacons fixedly arranged within the coverage region of the network node, and/or unmanned vehicles configured to move along a fixed trajectory within the coverage region of the network node. By using the radio beacons and/or unmanned vehicles, it is possible to provide an adequate amount of labelled data, i.e. the adequate first dataset. Moreover, the unmanned vehicles seem especially attractive for office/industrial environments where the unmanned vehicles, such as maintenance robots, could take part in gathering the first dataset along their programmed routes.

In one example embodiment of the first aspect, the at least one processor is configured to perform said assigning by using a neural network classifier. This may increase the efficiency of the semi-supervised ML algorithm.

In one other example embodiment of the first aspect, the at least one processor is configured to perform said assigning by using a Siamese network. This may increase the efficiency of the semi-supervised ML algorithm.

In one more other example embodiment of the first aspect, the at least one processor is configured to perform said assigning by solving a Euclidean distance minimization problem. This may increase the efficiency of the semi-supervised ML algorithm.

In one example embodiment of the first aspect, the semi-supervised ML algorithm is based on using a pre-trained autoencoder. This may make the apparatus according to the first aspect more flexible in use.

In one example embodiment of the first aspect, the semi-supervised ML algorithm is based on using a three-term loss function, and wherein the three-term loss function comprises a first term representative of a reconstruction error loss relating to the autoencoder, a second term representative of a mean square error loss for the first dataset, and a third term representative of a maximum absolute deviation loss for the second dataset. This may increase the efficiency of the semi-supervised ML algorithm even more.

In one example embodiment of the first aspect, the autoencoder comprises an encoder stage, a decoder stage and a latent layer therebetween, and wherein each of the encoder and decoder stages comprises one or more convolutional and/or dense layers, and the latent layer is implemented as a two- or three-dimensional layer of neurons. Such configuration of the autoencoder may provide UE position estimates with adequate accuracy.

According to a second aspect, a method for UE positioning is provided. The method starts with the step of receiving a first dataset comprising CSI measurements associated with first UEs and actual positions of the first UEs within a coverage region of a network node. Then, the method proceeds to the step of receiving a second dataset comprising at least one CSI measurement associated with at least one second UE whose position within the coverage region of the network node is to be estimated. After that, the method goes on to the step at which, based on the first and second datasets, the at least one CSI measurement associated with the at least one second UE is assigned to one of the first UEs that appears closest to the at least one second UE. The method ends up with the step of estimating the position of the at least one second UE within the coverage region of the network node by using a semi-supervised machine learning algorithm, taking into account the first and second datasets and the actual position of the closest first UE. By so doing, it is possible to obtain high-accuracy UE position estimates with minimal supervision, i.e. by using a limited amount of labelled training data. Moreover, unlike the existing semi-supervised ML-assisted techniques, the method according to the second aspect of the present disclosure is not restricted in application to the indoor scenario.

In one example embodiment of the second aspect, the first UEs comprise radio beacons fixedly arranged within the coverage region of the network node, and/or unmanned vehicles configured to move along a fixed trajectory within the coverage region of the network node. By using the radio beacons and/or unmanned vehicles, it is possible to provide an adequate amount of labelled data, i.e. the adequate first dataset. Moreover, the unmanned vehicles seem especially attractive for office/industrial environments where the unmanned vehicles, such as maintenance robots, could take part in gathering the first dataset along their programmed routes.

In one example embodiment of the second aspect, the step of assigning is performed by using a neural network classifier. This may increase the efficiency of the semi-supervised ML algorithm.

In one example embodiment of the second aspect, the step of assigning is performed by using a Siamese network. This may increase the efficiency of the semi-supervised ML algorithm.

In one other example embodiment of the second aspect, the step of assigning is performed by solving a Euclidean distance minimization problem. This may increase the efficiency of the semi-supervised ML algorithm.

In one more other example embodiment of the second aspect, the semi-supervised machine learning algorithm is based on using a pre-trained autoencoder. This may make the method according to the second aspect more flexible in use.

In one example embodiment of the second aspect, the semi-supervised machine learning algorithm is based on using a three-term loss function, and wherein the three-term loss function comprises a first term representative of a reconstruction error loss relating to the autoencoder, a second term representative of a mean square error loss for the first dataset, and a third term representative of a maximum absolute deviation loss for the second dataset. This may increase the efficiency of the semi-supervised ML algorithm even more.

In one example embodiment of the second aspect, the autoencoder comprises an encoder stage, a decoder stage and a latent layer therebetween, and wherein each of the encoder and decoder stages comprises one or more convolutional and/or dense layers, and the latent layer is implemented as a two- or three-dimensional layer of neurons. Such configuration of the autoencoder may provide UE position estimates with adequate accuracy.

According to a third aspect, a computer program product comprising a computer-readable medium is provided. The computer-readable medium stores a computer program. When executed by at least one processor, the computer program causes the at least one processor to perform the method according to the second aspect of the present disclosure. This may simplify the implementation of the method according to the second aspect of the present disclosure.

According to a fourth aspect, a network node is provided. The network node comprises a baseband unit (BBU) and the apparatus for UE positioning according to the first aspect of the present disclosure. The BBU is configured to:
  make the CSI measurements associated with the first UEs and the at least one CSI measurement associated with the at least one second UE;
  generate the first dataset by combining the CSI measurements associated with the first UEs and the actual positions of the first UEs within the coverage region of the network node;
  generate the second dataset based on the at least one CSI measurement associated with the at least one second UE; and
  provide the first and second datasets to the apparatus for UE positioning according to the first aspect of the present disclosure.

With the network node thus configured, it is possible to obtain high-accuracy UE position estimates with minimal supervision, i.e. by using a limited amount of labelled training data. Moreover, unlike the existing semi-supervised ML-assisted techniques, the network node according to the fourth aspect of the present disclosure is not restricted in application to the indoor scenario. It should also be noted that the network node according to the fourth aspect of the present disclosure may provide the high-accurate UE position estimates independently, i.e. without having to cooperate with any other network nodes (which is the case for the existing semi-supervised ML techniques).

According to a fifth aspect, an apparatus for UE positioning is provided. The apparatus comprises a means for receiving a first dataset comprising channel state information (CSI) measurements associated with first UEs and actual positions of the first UEs within a coverage region of a network node. The apparatus further comprises a means for receiving a second dataset comprising at least one CSI measurement associated with at least one second UE whose position within the coverage region of the network node is to be estimated. The apparatus further comprises a means for assigning, based on the first and second datasets, the at least one CSI measurement associated with the at least one second UE to one of the first UEs that appears closest to the at least one second UE. The apparatus further comprises a means for estimating the position of the at least one second UE within the coverage region of the network node by using a semi-supervised ML algorithm that receives, as inputs, the first and second datasets and the actual position of the closest first UE. With the apparatus thus configured, it is possible to obtain high-accuracy UE position estimates with minimal supervision, i.e. by using a limited amount of labelled training data. Moreover, unlike the existing semi-supervised ML-assisted techniques, the apparatus according to the fifth aspect of the present disclosure is not restricted in application to an indoor scenario, i.e. may also be used for UE positioning within the coverage region of the network.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION

Figure 1:
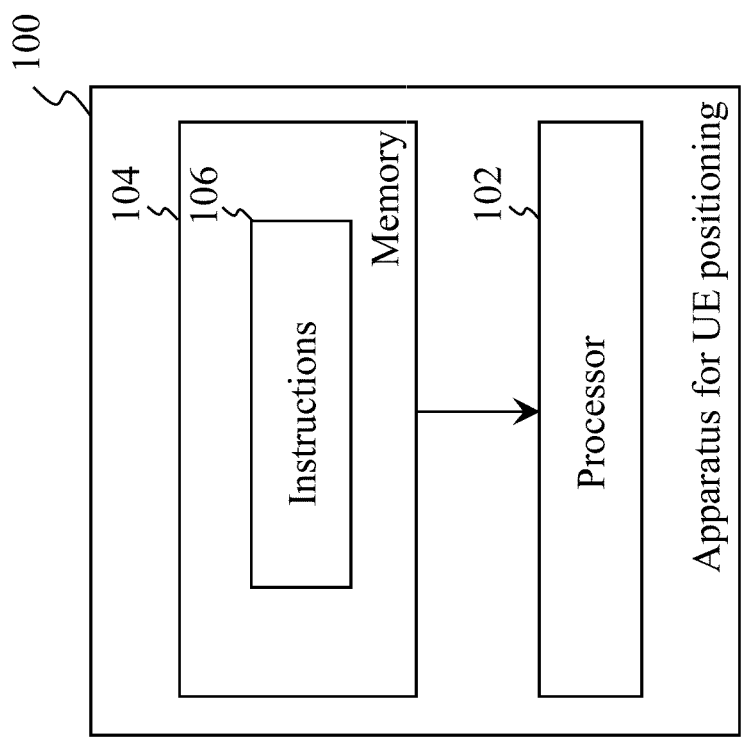
FIG. 1 shows a block-scheme of an apparatus for UE positioning in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus and method disclosed herein can be implemented in practice by using any numbers of the embodiments provided herein. Furthermore, it should be understood that any embodiment of the present disclosure can be implemented using one or more of the elements presented in the appended claims.

The word "example" is used herein in the meaning of "used as an illustration". Unless otherwise stated, any embodiment described herein as "example" should not be construed as preferable or having an advantage over other embodiments.

According to the example embodiments disclosed herein, first user equipments or first UEs for short may refer to special UEs that are in known positions in a predefined region of a wireless network (e.g., Radio Access Network (RAN)) and transmit continuous or periodic wireless signals with limited information (for example, their identification or location). The first UEs may comprise radio beacons fixedly arranged within the predefined region and/or unmanned vehicles configured to move along a fixed trajectory within the predefined region. Some examples of the unmanned vehicles include maintenance robots, delivery drones, other different unmanned ground and aerial vehicles, etc.

According to the example embodiments disclosed herein, at least one second user equipment or second UE for short may refer to a UE that is present in the same predefined region as the first UEs, but whose position is unknown and should be estimated. Examples of the second UE include a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (for example, a smart watch, smart glasses, a smart wrist band), an entertainment device (for example, an audio player, a video player, etc.), a vehicular component or sensor, a smart meter/sensor, industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications. In some example embodiments, the second UE may refer to at least two collocated and inter-connected UEs thus defined.

According to the example embodiments disclosed herein, a network node may relate to a fixed point of communication for the first and second UEs in the predefined region of the wireless network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The predefined region may be represented by a coverage region served by the network node. In turn, the coverage region may be represented by different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro-node, the network node serving the microcell may be referred to as a micro-node, and so on.

According to the example embodiments disclosed herein, UE positioning may refer to an ML-assisted technique for estimating the unknown position of the second UE by using certain radio measurements associated with the first UEs whose positions are known in the coverage region of the network node. Said measurements are intended to be made by the network node and may comprise channel state information (CSI) measurements. The CSI measurements may be made either in a time domain, or in a frequency domain, and characterize an actual communication channel (i.e. channel coefficients) between transmitting antennas at the UEs and a receiving antenna array at the network node.

Existing ML-assisted techniques for UE positioning mostly rely on a supervised ML algorithm that requires a large amount of labelled (or, in other words, training) data for its correct operation. Although the supervised ML algorithm may potentially provide the adequate accuracy of UE position estimates, its practical implementation for the purpose of UE positioning is under challenge, since any wireless network is a dynamically varying environment and any supervised ML model (e.g., a neural network) needs to be frequently retrained with large amounts of freshly acquired labelled data. Getting quick and frequent access to such a large amount of labelled data is not a trivial task. At the same time, the intentional reduction of the amount of labelled data may result in a situation where the supervised ML algorithm makes poor predictions for UE positions.

There are also a few existing semi-supervised ML-assisted techniques for UE positioning which require much less labelled data than the supervised ML-assisted techniques. However, these semi-supervised ML-assisted techniques suffer from the following drawbacks:
 they are specific to the indoor scenario and require multiple access points.
 they require the active involvement of a target UE in the positioning process (i.e. the UE needs to report certain radio measurements to a central server);
 they are not exactly designed for high-accuracy UE positioning but for obtaining a logical chart of UEs, for which reason the resulting UE position estimates are quite inaccurate.

The example embodiments disclosed herein provide a technical solution that allows mitigating or even eliminating the above-sounded drawbacks peculiar to the prior art. In particular, the technical solution involves using a semi-supervised ML algorithm for UE positioning based on the CSI measurements. Since CSI is a function of a UE position, the idea is to make use of it for estimating the UE position at the network node. Unlike the existing supervised ML-assisted techniques, the technical solution disclosed herein focuses on achieving the high accuracy of UE position estimates with a limited amount of labelled data. Unlike the existing semi-supervised ML-assisted techniques, the technical solution disclosed herein is not restricted in application to the indoor scenario and requires only one network node involved (of course, multiple network nodes may also be used and may even lead to a higher accuracy but at the cost of increased complexity). Furthermore, unlike the existing semi-supervised ML-assisted techniques, the technical solution disclosed herein does not require a target UE (i.e. the second UE in terms of the present disclosure) to be actively involved in the positioning process itself: there is no need for the target UE to report any radio measurements (e.g. time of arrival (ToA), direction of arrival (DoA), received signal strength (RSS), etc.) to the network node because the CSI measurements may be made at the network node when the target UE transmits pilot sequences.

FIG. 1 shows a block-scheme of an apparatus 100 for UE positioning in accordance with one example embodiment. As shown in FIG. 1, the apparatus 100 comprises a processor 102 and a memory 104. The memory 104 is coupled to the processor 102 and stores processor-executable instructions 106 which, when executed by the processor 102, cause the processor 102 to perform the aspects of the present disclosure, as will be explained later. It should be noted that the number, arrangement and interconnection of the constructive elements constituting the apparatus 100, which are shown in FIG. 1, are not intended to be any limitation of the present disclosure, but merely used to provide a general idea of how the constructive elements may be implemented within the apparatus 100.

The processor 102 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 102 may be implemented as any combination of one or more of the aforesaid. As an example, the processor may be a combination of two or more microprocessors.

The memory 104 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 106 stored in the memory 104 may be configured as a computer executable code which causes the processor 102 to perform the aspects of the present disclosure. The computer executable code may be written in any combination of one or more programming languages, such as Java, C++, or the like. In some examples, the computer executable code may be in the form of a high-level language or in a pre-compiled form, and be generated by an interpreter (also pre-stored in the memory 104) on the fly.

Figure 2:
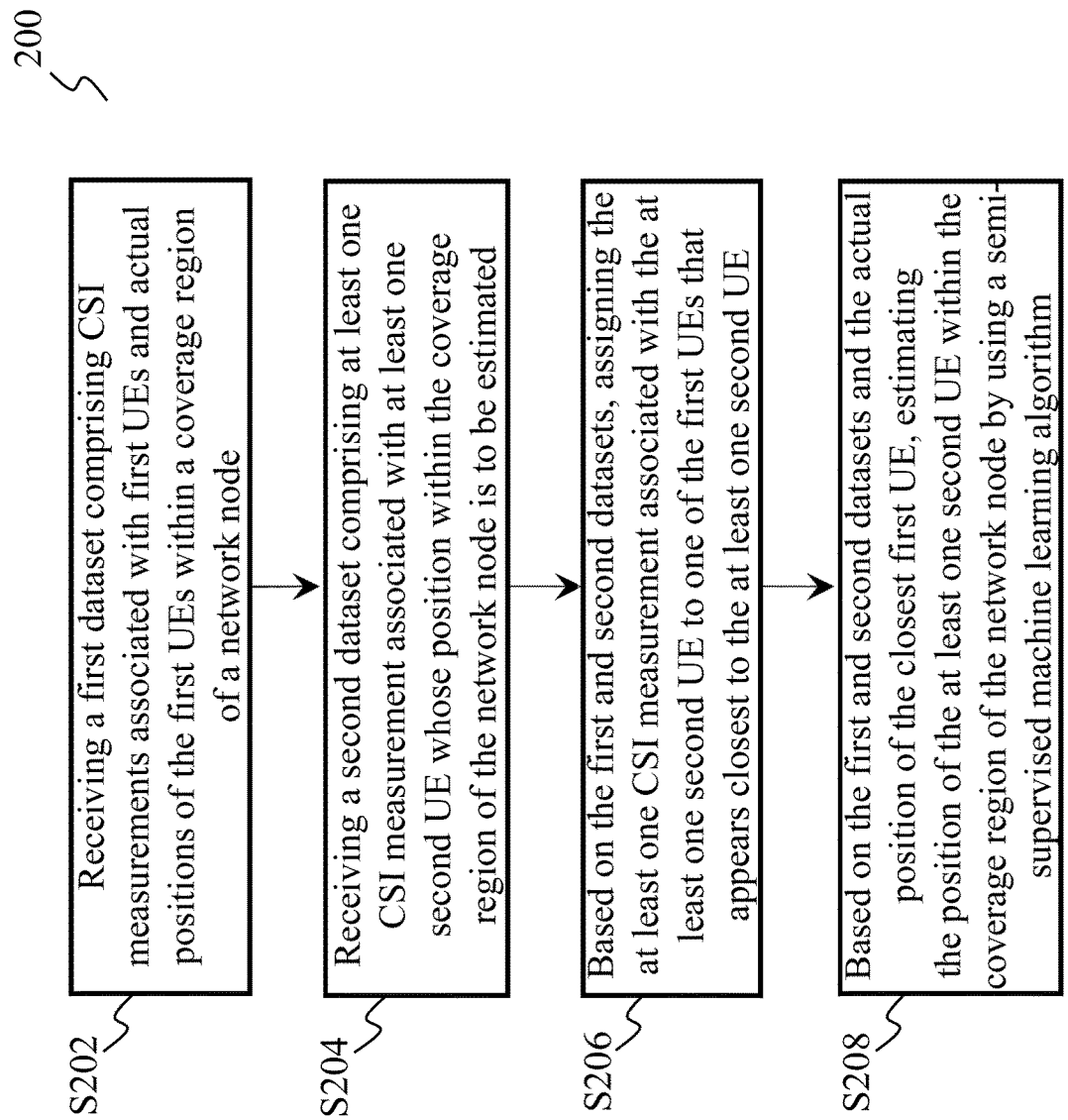
FIG. 2 shows a flowchart of a method for UE positioning in accordance with one example embodiment.

FIG. 2 shows a flowchart of a method 200 for UE positioning in accordance with one example embodiment. The method 200 comprises steps S202-S208 each performed by the processor 102 included in the apparatus 100. The method 200 starts with the step S202, in which the processor 102 receives a first dataset comprising CSI measurements associated with first UEs and actual positions of the first UEs within a coverage region of a network node. Then, the method 200 proceeds to the step S204, in which the processor 102 receives a second dataset comprising at least one CSI measurement associated with at least one second UE whose position within the coverage region of the network node is to be estimated. The first dataset may be referred to as a set of labelled data, while the second dataset may be referred to as a set of unlabelled data. It should be noted that the steps S202 and S204 may be performed in parallel, if required. As for the first and second datasets themselves, they are prepared by the network node, as will be described later. After that, the method 200 goes on to the step S206, in which the processor 102 uses the first and second datasets to assign the at least one CSI measurement associated with the at least one second UE to one of the first UEs that appears closest to the at least one second UE. The method 200 ends up with the step 208 of estimating the position of the at least one second UE within the coverage region of the network node by using a semi-supervised ML algorithm that receives, as inputs, the first and second datasets and the actual position of the closest first UE.

In some example embodiments, the step S206 of the method 200 is performed by the processor 102 of the apparatus 100 by using a neural network classifier, a Siamese network, or by solving a Euclidean distance minimization problem. Each of these embodiments may allow the most relevant first UE among the first UEs to be selected as the nearest neighbor for the second UE, which in turn may increase the efficiency of the semi-supervised ML algorithm used further in the step S208 of the method 200.

In one example embodiment, the semi-supervised ML algorithm used in the step S208 of the method 200 is based on using a pre-trained autoencoder. Moreover, the autoencoder may be pre-trained by using a three-term loss function, with a first term representative of a reconstruction error loss relating to the autoencoder, a second term representative of a mean square error loss for the first dataset, and a third term representative of a maximum absolute deviation loss for the second dataset. The combination of all the three terms is crucial towards obtaining meaningful and accurate position estimates at the autoencoder.

Figure 3:
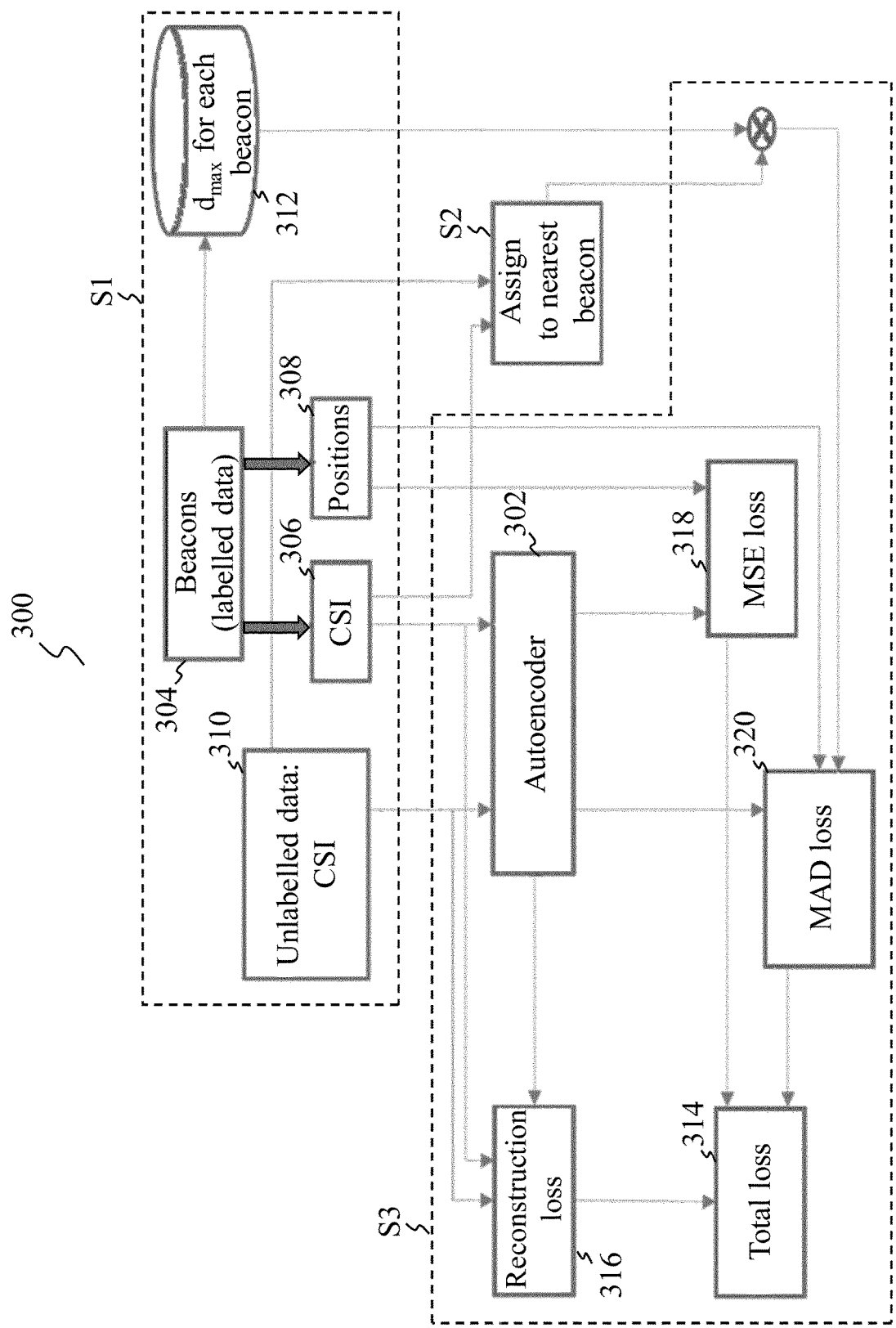
FIG. 3 shows a flowchart of a method for training an autoencoder used in a semi-supervised ML algorithm in accordance with one example embodiment.

FIG. 3 shows a flowchart of a method 300 for training an autoencoder 302 used in the semi-supervised ML algorithm in accordance with one example embodiment. In this example embodiment, it is assumed that the first UEs are represented by the fixed radio beacons distributed within the coverage region of the network node. The exact number of the radio beacons and their fixed positions depend on the coverage region of the network node. In general, the denser the distribution of the radio beacons, the better. The whole method 300 may be divided into three steps: S1, S2, and S3. The step S1 is a data preparation step in which the network node prepares the first and second datasets and the processor 102 of the apparatus 100 receives them from the network node in the steps S202 and S204 of the method 200. The step S2 is an assigning step which substantially reproduces the step S206 of the method 200, i.e. is aimed at assigning every unlabelled data of the second dataset to its closest beacon (said closeness is defined in terms of an Euclidean distance between the source of the unlabelled data, i.e. the second UE, and the radio beacon). The step S3 is a training step in which the processor 102 of the apparatus 100 uses the first and second datasets and the result of the step S2 (i.e. the actual position of the closest radio beacon) for training the autoencoder 302. It should be clear that the steps S1, S2, and S3 should be performed in the order of their numbering. Each of the steps S1, S2, and S3 will be described further in more detail.

Step S1

Assume that $\mathcal{B}=\{1, 2, \ldots, N_b\}$ denotes a set of beacon indices, where $N_b$ is the total number of radio beacons 304 involved. Associated with every beacon index b is a pair $(X_{CSI,b}, y_b)$, where $X_{CSI,b}$ denotes a CSI 306 of a beacon b measured at the network node, and $y_b$ denotes an actual position 308 of the beacon b. Given this, a set $\{(X_{CSI,b}, y_b), b \in \mathcal{B}\}$ constitutes a labelled dataset $\mathcal{L}$, i.e. the first dataset in terms of the present disclosure. Next, let $\mathcal{U}$ denote an unlabelled dataset, i.e. the second dataset in terms of the present disclosure. Every element of $\mathcal{U}$ is a CSI measurement 310, denoted by $X_{CSI}$, which is associated with the second UE (not shown) but does not have a certain association to the position of the closest beacon. Thus, a set of all CSI measurements is a combination of $\mathcal{L}$ and $\mathcal{U}$.

It should be noted that, in some cases, it may be possible to obtain multiple CSI measurements $\{X_{CSI,b,i}, i=1, 2, \ldots, l_b\}$, taken over a short period of time for each beacon b among the beacons 304. In such cases, $X_{CSI,b}$ is the collection of these measurements. This helps in mitigating time-varying effects due to moving scatterers. Thus, the first dataset is $\{(X_{CSI,b}, y_b), i \in \{1, 2, \ldots, b \in \mathcal{B}\}\}$. In the following parts of the present disclosure, we assume that there is a single measurement per beacon, but ones skilled in the art would understand that the steps of the method 300 are similar for the case of multiple CSI measurements.

Once the beacon positions 308, i.e. $y_b$, $b \in \mathcal{B}$, are identified, it is necessary to find, for each radio beacon, all points closer to its position than to any other radio beacon among the radio beacons 304. To do this, let $\mathcal{R}$ denote the coverage region of the network node. In other words, $\mathcal{R}$ is the region within which the network node is trying to localize the second UE(s). Next, the following estimations should made:

$$d_{max}(b) = \max_{x \in \mathcal{R}_b}\{\|y_b - x\|\},$$

$$\forall b \in \mathcal{B},$$

$$\mathcal{R}_b = \{x \in \mathcal{R} \mid \|y_b - x\| < \|y_c - x\|, \forall c \neq b\}$$

In other words, a Voronoi tessellation of $\mathcal{R}$ is performed to obtain the region $\mathcal{R}_b$ for each radio beacon, $b \in \mathcal{B}$. Every point in the region $\mathcal{R}_b$ is closer to the position of beacon b than to any other beacon, and $d_{max}(b)$ is the maximum distance of any point in $\mathcal{R}_b$ from beacon b. All values of $d_{max}(b)$ for the radio beacons 304 are then stored in a database 312 for further use.

The exact value of $d_{max}(b)$ may be difficult to compute, but an approximation is enough in such a case. One possible way to compute such an approximation is as follows:

1) A large number of points is distributed uniformly over the entire coverage area of the network node. The points denote the fixed positions of the radio beacons 304. The larger the number of the points, the smaller the Euclidean distance between the adjacent points, hence the better the accuracy of the approximation.
2) The points are clustered by assigning each point to its closest radio beacon (the closeness is with respect to the Euclidean distance). This results in the formation of $N_b$ clusters, one for each beacon.
3) Within each cluster (identified by its associated closest radio beacon), the maximum distance of a point to the closest beacon is calculated. This represents the approximation for $d_{max}$ for that beacon.

Step S2

The assigning step may be performed by building a classifier function C that assigns each unlabelled CSI measurement $X_{CSI}$ to the beacon index whose position appears to be closest to its unknown associated position (i.e. the position of the second UE). More specifically, the classifier function C performs the following operation on $X_{CSI}$, with its associated unknown position given by y:

$$C(X_{CSI}) = \operatorname*{argmin}_{b \in \mathcal{B}}\{\|y - y_b\|\}.$$

A few candidates for the classifier function C may look as follows:
1. A function that returns the argument that minimizes the Euclidean distances between appropriate components of $X_{CSI}$ and $X_{CSI,b}$ for all $b \in \mathcal{B}$.
2. A neural network classifier that is trained on a separate set of labelled data for the task of classification.
3. A Siamese network that is trained on a separate but small set of labelled data for the purpose of classification. Siamese networks for image classification and recognition may be used for building the classifier function C.

Step S3

The training step is based on using, as inputs, the results of the steps S1 and S2—i.e. the first and second datasets and the actual position of the closest radio beacon—to train the autoencoder 302.

Figure 4:
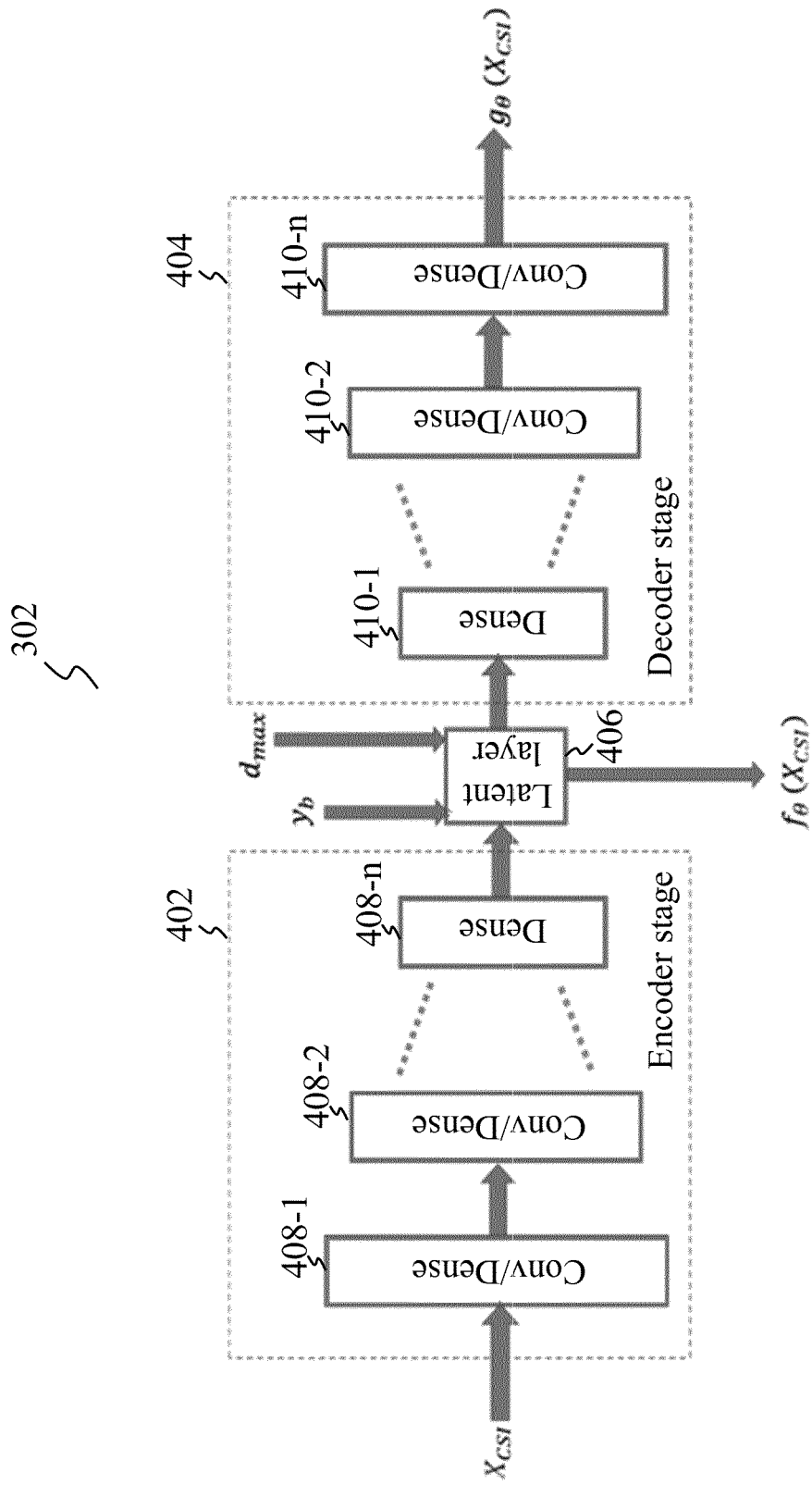
FIG. 4 shows a block-scheme of the autoencoder in accordance with one example embodiment.

FIG. 4 shows a block-scheme of the autoencoder 302 in accordance with one example embodiment. As shown in FIG. 4, the autoencoder 302 comprises an encoder stage 402 and a decoder stage 404 with a latent layer 406 therebetween. The encoder stage 402 may comprise multiple layers 408-1, 408-2, . . . , 408-n of neurons. Similarly, the decoder stage 404 may comprise multiple layer 410-1, 410-2, . . . , 410-n of neurons. The layers of the encoder stage 402 and the decoder stage 404 may be either convolutional layers or dense layers, depending on the type of the CSI measurements used. Of course, such configuration of the autoencoder 302 should not be considered as any limitation of the present disclosure, and other example embodiments are possible in which, for example, the dense layers are used without the convolutional layers, or vice versa. The latent layer 406 is typically a 2- or 3-dimensional layer of neurons and its output represents the position estimate of the second UE. More specifically, for the input $X_{CSI}$ to the encoder stage 402, the output of the latent layer 406 is denoted by $f_\theta(X_{CSI})$, where $\{\theta\}$ is the set of parameters/weights for the autoencoder 302. The output of the decoder stage 404 is denoted by $g_\theta(X_{CSI})$.

During training, it is preferred to use a three-term loss function 314, as defined above. That is, the loss function comprises a first term 316 representative of the reconstruction error loss relating to the autoencoder 302, a second term 318 representative of the mean square error (MSE) loss for the first dataset, and a third term 320 representative of the maximum absolute deviation (MAD) loss for the second dataset. Given the denotations above, the loss function 314 used for training the autoencoder 302 may be then written as follows:

$$L = \sum_{X_{CSI} \in S} \|X_{CSI} - g_\theta(X_{CSI})\|^2 + w_1 \sum_{(X_{CSI,b}, y_b) \in \mathcal{L}} \|y_b - f_\theta(X_{CSI,b})\|^2 + w_2 \sum_{X_{CSI} \in \mathcal{U}} \max\{\|X_{CSI} - y_{C(X_{CSI})}\|^2 - d_{max}^2(C(X_{CSI})), 0\}.$$

Here, $w_1, w_2 \in (0,1]$ are the weights assigned to the last two (second and third) terms of the loss function 314. These weights are hyperparameters which need to be chosen heuristically, e.g., through a grid search, or through meta learning.

In some example embodiments, it is possible that, besides the beacon positions, the positions of some other UEs which do not belong to the first UEs might be known to the network node (one example is when such UEs know their positions using a Global Navigation Satellite System (GNSS) and report them to the network node). Unlike the first UEs, these UEs are not used in the step S206 of the method 200 but should be taken into account to form a part of the MSE loss (i.e. the second term 318 of the total loss function 314).

The step S3 is repeated until the loss function 314, i.e. L, is minimized or until a predefined number of training cycles is reached. After that, the pre-trained autoencoder 302 may be used in the step S208 of the method 200.

Figure 5:
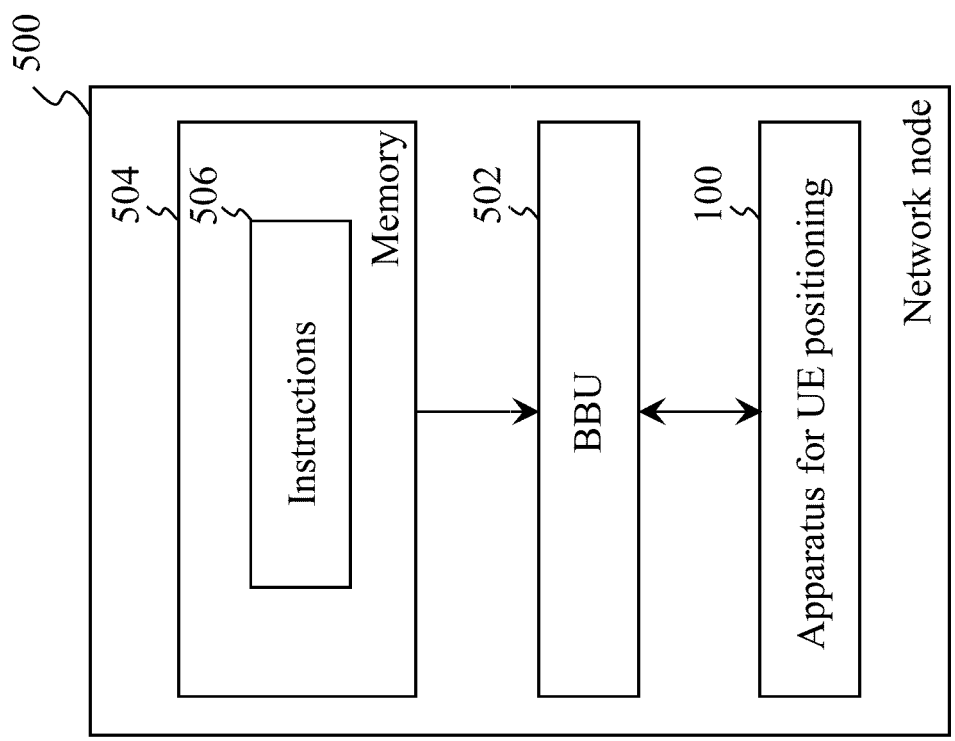
FIG. 5 shows a block-scheme of a network node in accordance with one example embodiment.

FIG. 5 shows a block-scheme of a network node 500 in accordance with one example embodiment. As shown in FIG. 5, the network node 500 comprises a baseband unit (BBU) 502, a memory 504, and the apparatus 100. The memory 504 is coupled to the BBU 502 and stores executable instructions 506 which, when executed by the BBU 502, cause the BBU 502 to perform the aspects of the present disclosure, as will be explained later. It should be noted that the number, arrangement and interconnection of the constructive elements constituting the network node 500, which are shown in FIG. 5, are not intended to be any limitation of the present disclosure, but merely used to provide a general idea of how the constructive elements may be implemented within the network node 500.

The BBU is also known as a baseband processor and may relate to an electronic device (ED) or an ED pool in which baseband processing is carried out for the communication channel between the network node 500 and the first and second UEs. Some practical examples of the BBU include a front-end processor, a communication controller, or any other similarly functioning device. In general, the BBU is responsible for digital signal processing and may, for example, execute the following functions: CSI measurements, digital intermediate frequency (IF) to baseband conversion/digital baseband to IF conversion, modulation/demodulation, constellation mapping/demapping, scrambling/descrambling, and/or encoding/decoding.

As for the memory 504 and the executable instructions 506, they may be implemented in the same or similar manner as the memory 104 and the processor-executable instructions 106, respectively, in the apparatus 100.

Figure 6:
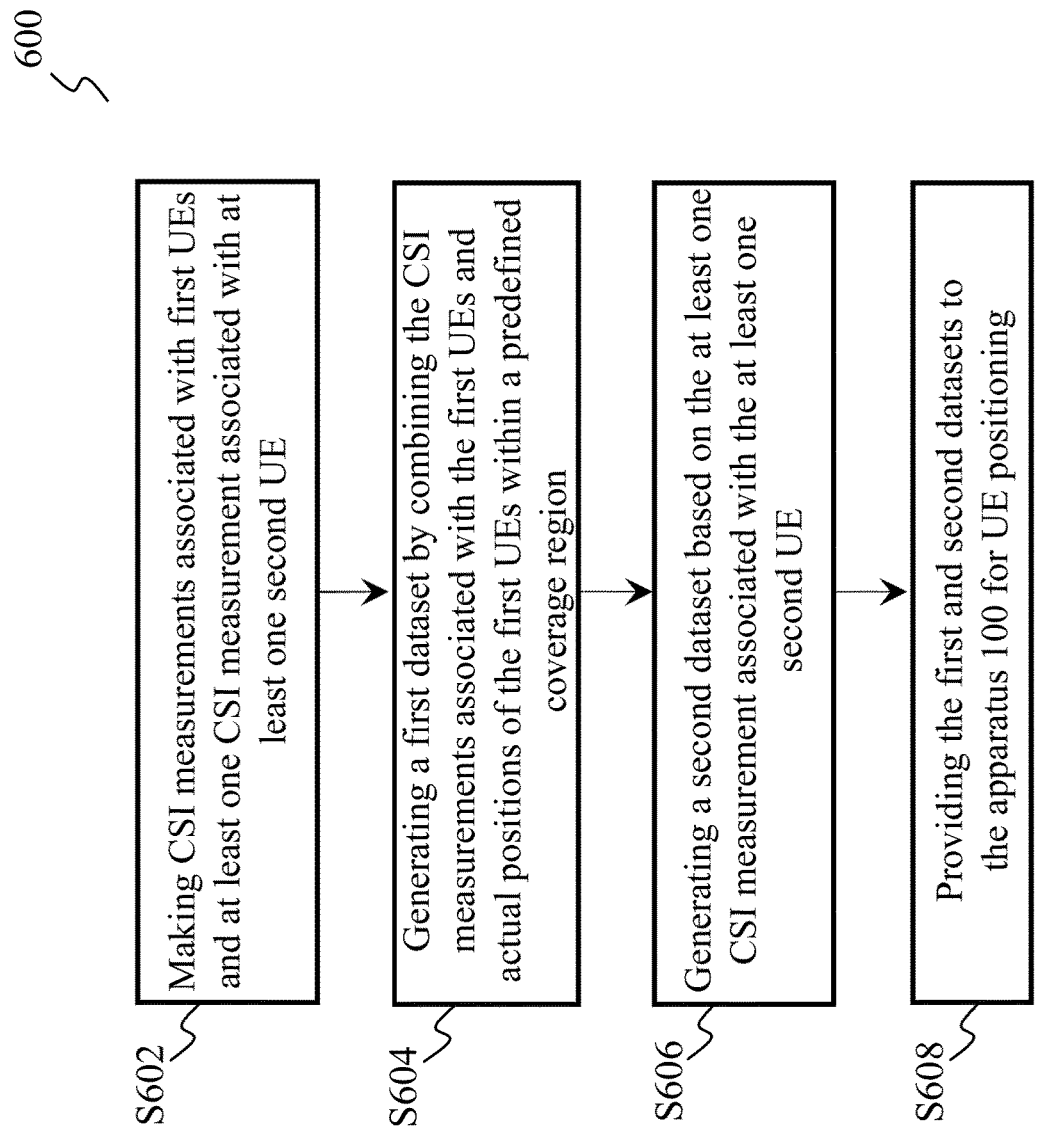
FIG. 6 shows a flowchart of a method for operating the network node shown in FIG. 5 in accordance with one example embodiment.

FIG. 6 shows a flowchart of a method 600 for operating the network node 500 in accordance with one example embodiment. The method 600 comprises steps S602-S608 each performed by the BBU 502 included in the network node 500. The method 600 starts with the step S602, in which the BBU 502 makes the CSI measurements associated with the first UEs and the at least one CSI measurement associated with the at least one second UE. Then, the method 600 proceeds to the step S604, in which the BBU 502 generates the first dataset by combining the CSI measurements associated with the first UEs and the actual positions of the first UEs within the coverage region of the network node 500. After that, the next step S606 is initiated, in which the BBU 502 generates the second dataset based on the at least one CSI measurement associated with the at least one second UE. It should be noted that the steps S604 and S606 may be performed by the BBU 502 in parallel, if required. In general, the steps S602-S606 constitute the step S1 (data preparation) from the method 300. The method 600 ends up with the step S608, in which the BBU 502 provides the first and second datasets to the apparatus 100 for their use in UE positioning in accordance with the method 200.

Simulation Results

Figure 7:
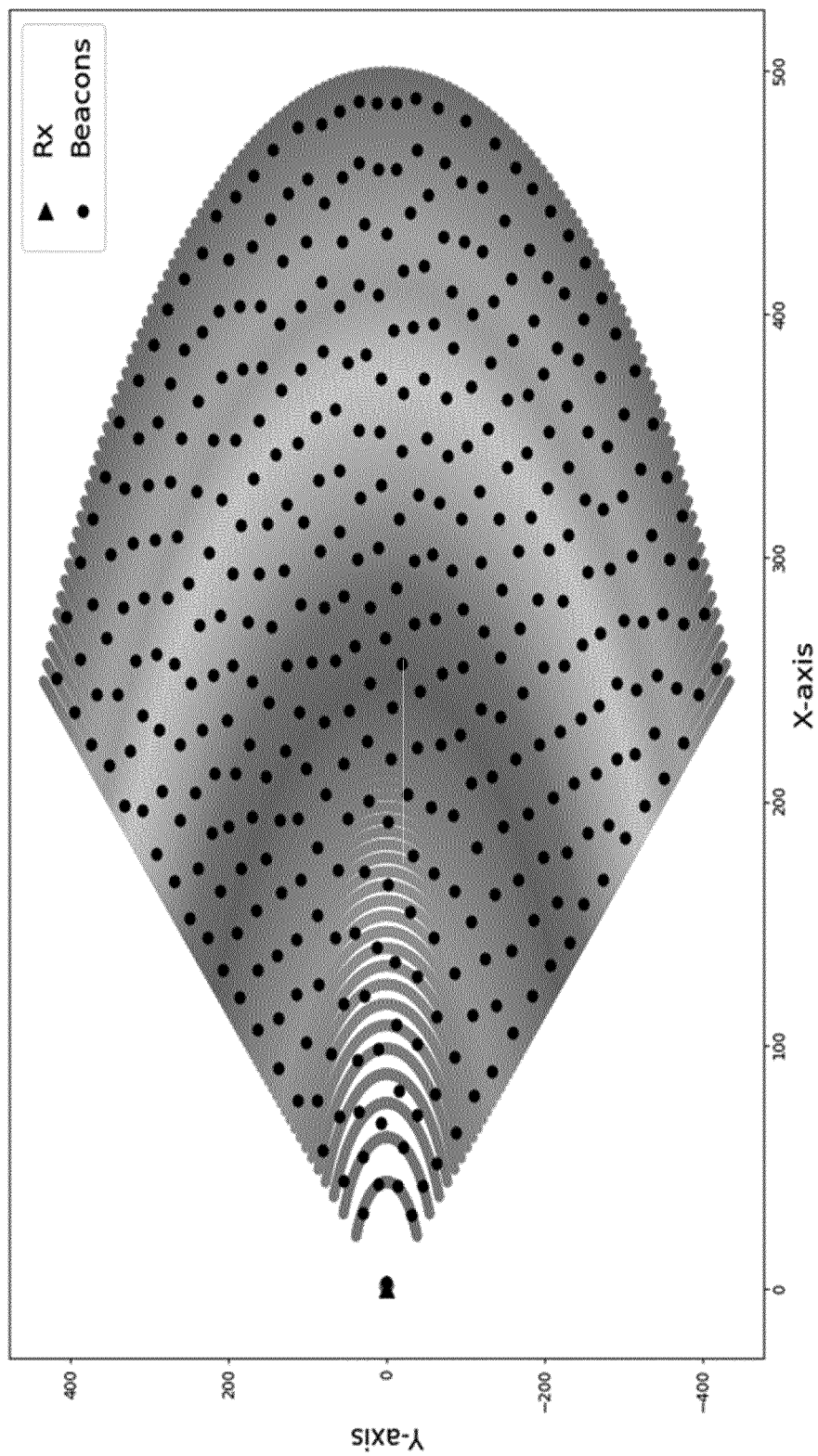
FIG. 7 shows a hypothetical coverage region used for the purpose of simulation.

FIG. 7 shows a hypothetical coverage region used for the purpose of simulation. In particular, the coverage region was formed by 16384 points arranged in the form of a conic sector as shown in FIG. 7 (where each of the X-axis and the Y-axis represents a distance expressed in meters). The network node, like the network node 500, was at the sector origin (marked as 'Rx' in FIG. 7). 400 radio beacons were uniformly spaced across the conic sector (these radio beacons are denoted by black dots FIG. 7). The simple line of sight model with 16 antennas at the network node was used for constructing such a conic sector.

Figure 8B:
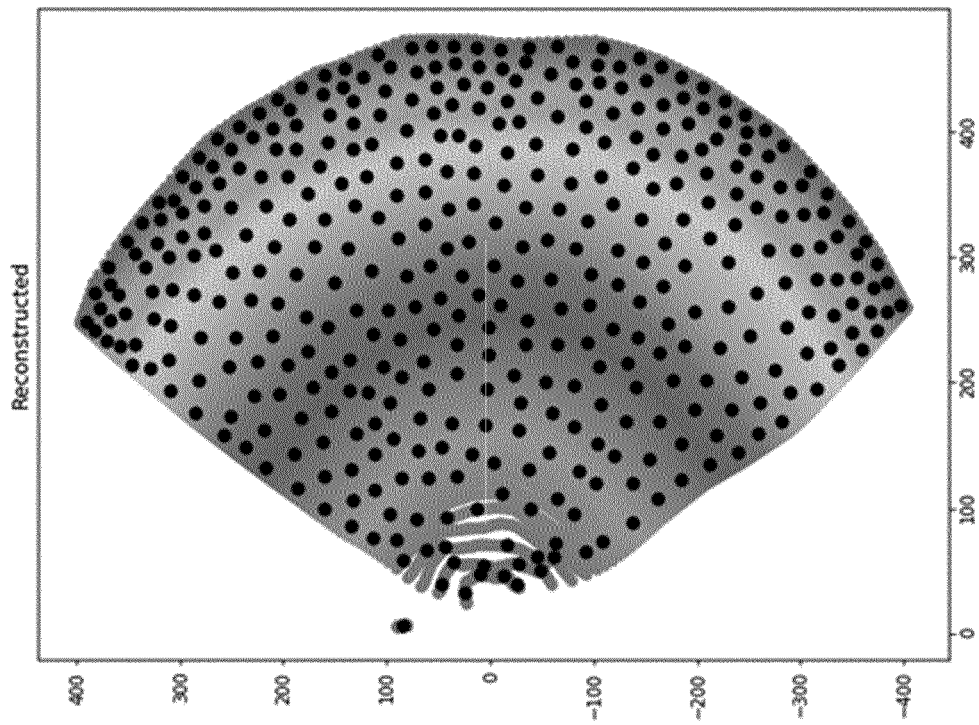
FIGS. 8A and 8B show simulation results obtained by using the method shown in FIG. 2 and the autoencoder pre-trained in accordance with the method shown in FIG. 3.
Figure 8A:
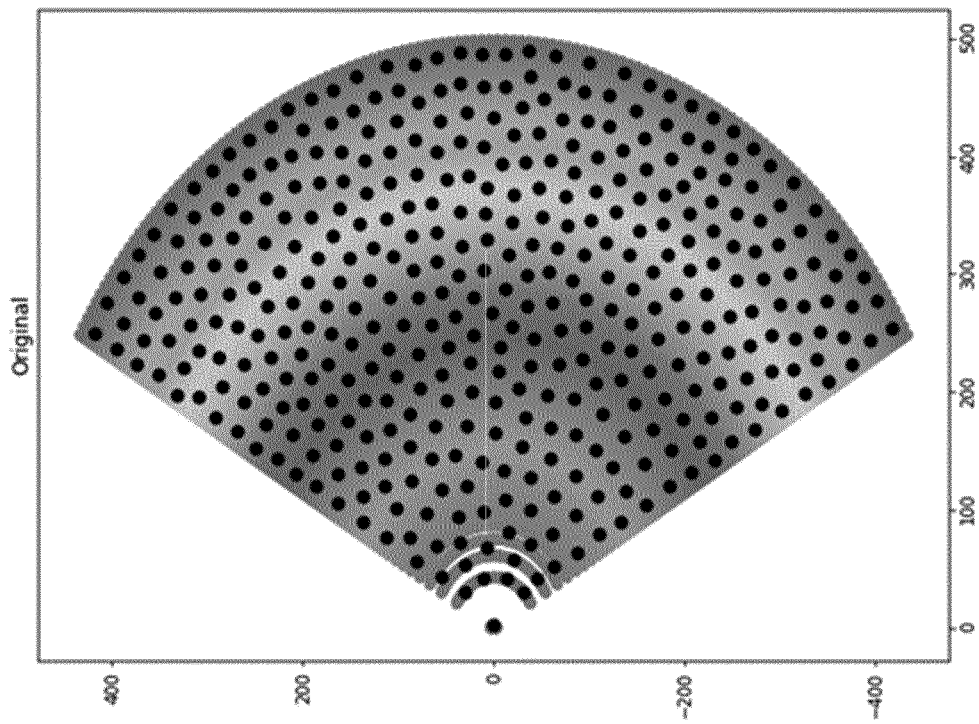

FIGS. 8A and 8B show simulation results obtained by using the method 200 and the autoencoder 302 pre-trained in accordance with the method 300. In particular, FIG. 8A repeats FIG. 7 described above, i.e. the actual distribution of the beacon positions within the conic sector. FIG. 8A is repeated here for ease of comparison. FIG. 8B illustrates a reconstructed distribution of the beacon positions within the same conic sector. During the simulation, each radio beacon was alternately considered as the second UE. In other words, the positions of the radio beacons were estimated by using the method 200 and the autoencoder 302 to check if they matched the actual positions of the radio beacons. As a result of such simulation, the achieved mean positioning accuracy is 11.2 m.

Figure 9B:
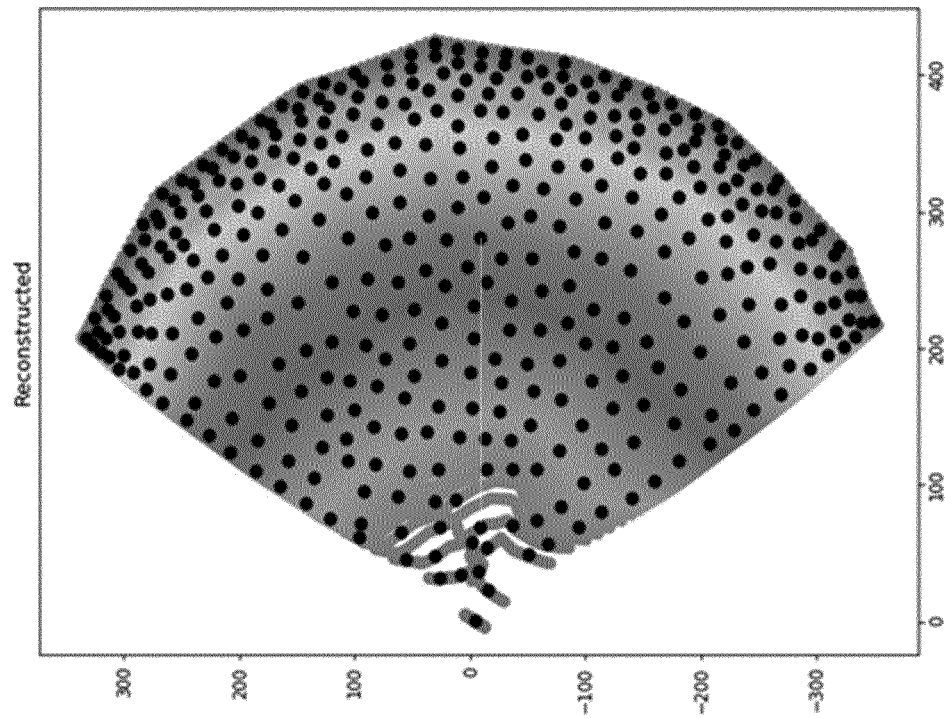
FIGS. 9A and 9B show simulation results obtained by using one semi-supervised ML-assisted technique from the prior art.
Figure 9A:
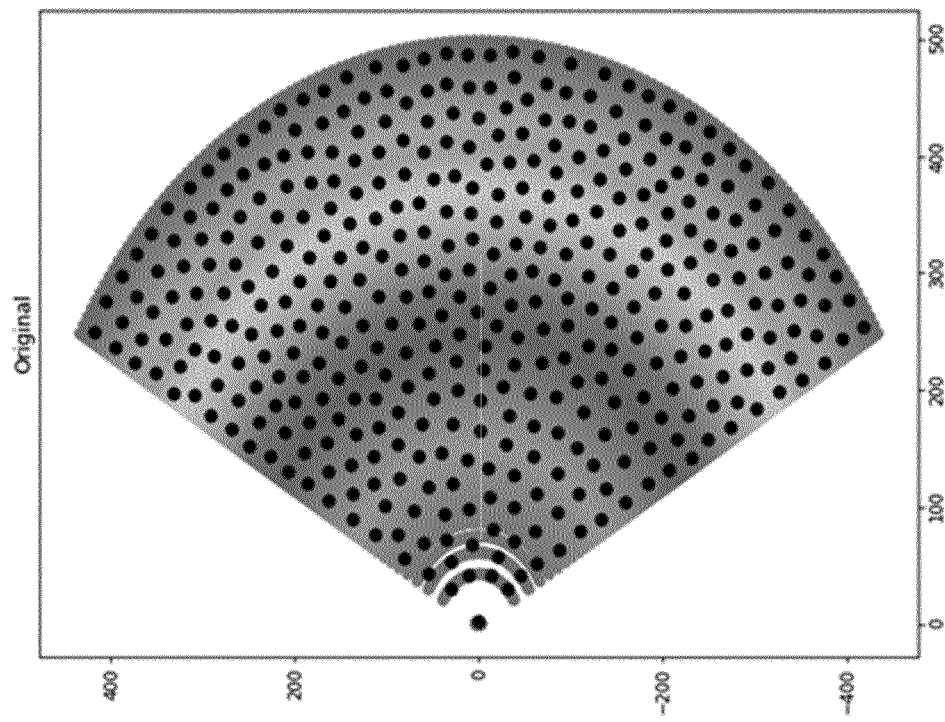

FIGS. 9A and 9B show simulation results obtained by using the semi-supervised ML-assisted technique disclosed in the following article: C. Studer, S. Medjkouh, E. Gönültaş, T. Goldstein, and O. Tirkkonen, "Channel Charting: Locating Users Within the Radio Environment Using Channel State Information," in IEEE Access, vol. 6, pp. 47682-47698, 2018. Similarly, FIG. 9A repeats FIG. 7 for ease of comparison for ease of comparison. FIG. 9B illustrates the reconstructed distribution of the beacon positions within the same conic sector. As a result of such simulation based on the prior art semi-supervised ML technique, the achieved mean positioning accuracy is 25.7 m. Thus, the selected semi-supervised ML-assisted technique provides the positioning accuracy worse than that of the method 200. In its defence, it should be noted that the selected semi-supervised ML-assisted technique was not really designed for actual UE positioning and was used only to highlight the advantage of the method 200.

It should be noted that each block, step or operation of the methods 200, 300 and 600, or any combinations of the blocks, steps or operations, can be implemented by various means, such as hardware, firmware, and/or software. As an example, one or more of the blocks, steps or operations described above can be embodied by processor executable instructions, data structures, program modules, and other suitable data representations. Furthermore, the processor executable instructions which embody the blocks, steps or operations described above can be stored on a corresponding data carrier and executed by at least one processor implementing functions of the apparatus 100 and the network node 500, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made therein, without departing from the scope of legal protection which is defined by the appended claims. In the appended claims, the word "comprising" and its derivatives does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. An apparatus for user equipment (UE) positioning, comprising:
   at least one processor; and
   a coupled to the at least one processor and storing processor-executable instructions,
   wherein the at least one processor is configured, when executing the processor-executable instructions, to:
   receive a first dataset comprising channel state information (CSI) measurements associated with first UEs and actual positions of the first UEs within a coverage region of a network node;
   receive a second dataset comprising at least one CSI measurement associated with at least one second UE whose position within the coverage region of the network node is to be estimated;
   based on the first and second datasets, assign the at least one CSI measurement associated with the at least one second UE to one of the first UEs that appears closest to the at least one second UE;
   wherein the at least one processor is further configured, when executing the processor-executable instructions, to:
   based on the first and second datasets and the actual position of the closest first UE, estimate the position of the at least one second UE within the coverage region of the network node by using a semi-supervised machine learning algorithm,
   wherein the semi-supervised machine learning algorithm is based on using a pre-trained autoencoder and a three-term loss function, and wherein the three-term loss function comprises a first term representative of a reconstruction error loss relating to the autoencoder, a second term representative of a mean square error loss for the first dataset, and a third term representative of a maximum absolute deviation loss for the second dataset.

2. The apparatus of claim 1, wherein the first UEs comprise radio beacons fixedly arranged within the coverage region of the network node, and/or unmanned vehicles configured to move along a fixed trajectory within the coverage region of the network node.

3. The apparatus of claim 1, wherein the at least one processor is configured to perform said assigning by using a neural network classifier.

4. The apparatus of claim 1, wherein the at least one processor is configured to perform said assigning by using a Siamese network.

5. The apparatus of claim 1, wherein the at least one processor is configured to perform said assigning by solving a Euclidean distance minimization problem.

6. The apparatus of claim 1, wherein the autoencoder comprises an encoder stage, a decoder stage and a latent layer therebetween, and wherein each of the encoder and decoder stages comprises one or more convolutional and/or dense layers, and the latent layer is implemented as a two- or three-dimensional layer of neurons.

7. A method for user equipment (UE) positioning, comprising:
   receiving a first dataset comprising channel state information (CSI) measurements associated with first UEs and actual positions of the first UEs within a coverage region of a network node;
   receiving a second dataset comprising at least one CSI measurement associated with at least one second UE whose position within the coverage region of the network node is to be estimated;
   based on the first and second datasets, assigning the at least one CSI measurement associated with the at least one second UE to one of the first UEs that appears closest to the at least one second UE;
   wherein the method further comprising:
   based on the first and second datasets and the actual position of the closest first UE, estimating the position of the at least one second UE within the coverage region of the network node by using a semi-supervised machine learning algorithm, wherein the semi-supervised machine learning algorithm is based on using a pre-trained autoencoder and a three-term loss function, and wherein the three-term loss function comprises a first term representative of a reconstruction error loss relating to the autoencoder, a second term representative of a mean square error loss for the first dataset, and a third term representative of a maximum absolute deviation loss for the second dataset.

8. The method of claim 7, wherein the first UEs comprise radio beacons fixedly arranged within the coverage region of the network node, and/or unmanned vehicles configured to move along a fixed trajectory within the coverage region of the network node.

9. The method of claim 7, wherein said assigning is performed by using a neural network classifier.

10. The method of claim 7, wherein said assigning is performed by using a Siamese network.

11. The method of claim 7, wherein said assigning is performed by solving a Euclidean distance minimization problem.

12. The method of claim 7, wherein the autoencoder comprises an encoder stage, a decoder stage and a latent layer therebetween, and wherein each of the encoder and decoder stages comprises one or more convolutional and/or dense layers, and the latent layer is implemented as a two- or three-dimensional layer of neurons.

13. A non-transitory computer-readable medium comprising computer readable instructions encoded thereon, wherein the computer readable instructions, when executed by at least one processor, causes the at least one processor to perform the method according to claim 7.

14. A network node comprising:
a baseband unit (BBU); and
the apparatus for UE positioning according to claim 1,
wherein the BBU is configured to:
   make the CSI measurements associated with the first UEs and the at least one CSI measurement associated with the at least one second UE;
   generate the first dataset by combining the CSI measurements associated with the first UEs and the actual positions of the first UEs within the coverage region of the network node;
   generate the second dataset based on the at least one CSI measurement associated with the at least one second UE; and
   provide the first and second datasets to the apparatus for UE positioning.

* * * * *